N. M. LOWE.
Psychrometers.

No. 202,276.   Patented April 9, 1878.

WITNESSES
Frank G. Parker
Nath'l Evans

INVENTOR
Nathaniel M. Lowe
Per William Edson Atty

UNITED STATES PATENT OFFICE.

NATHANIEL M. LOWE, OF BOSTON, MASSACHUSETTS.

IMPROVEMENT IN PSYCHROMETERS.

Specification forming part of Letters Patent No. 202,276, dated April 9, 1878; application filed July 27, 1877.

*To all whom it may concern:*

Be it known that I, NATHANIEL M. LOWE, of Boston, in the county of Suffolk and State of Massachusetts, have invented a new and useful Improvement in Hygrometers, of which the following is a specification:

The nature of my invention consists in combining, with a pair of wet and dry bulb thermometers, an auxiliary scale having proportional graduations, increasing from the higher to the lower degrees of temperature, a movable set of pointers, two of which move over the auxiliary scale, while the third serves as an index to point out on a hygrometer-chart or graphic table the relative humidity, the dew-point, &c.

Figure 1:
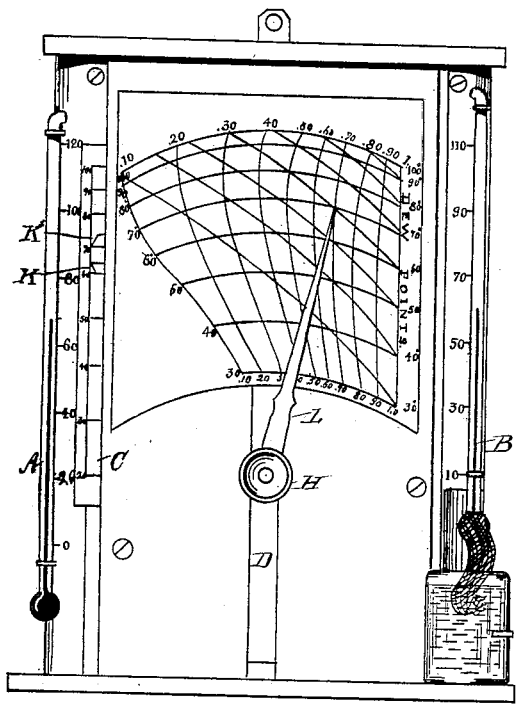
Figure 2:
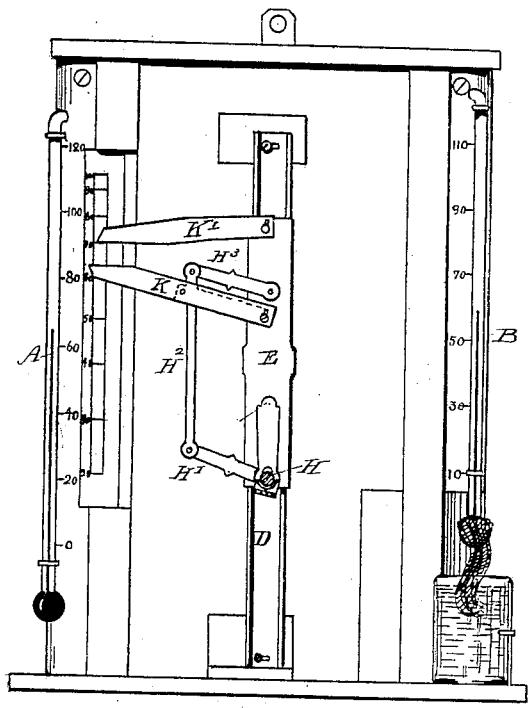

Referring to the drawings, Figure 1 is an elevation of my hygrometer. Fig. 2 shows the same with the front plate removed.

A B represent, respectively, the dry and wet bulb thermometers. C is a scale graduated to degrees, the lower graduations being larger than the upper, as will hereinafter be explained. D is a fixed standard, upon which the slide E moves. Upon this slide E, I have a knob, H, which turns freely on a pin affixed to the slide. To the knob H, I attach a pointer, L, Fig. 1, which may swing around the pin which holds the knob. I also attach to the knob H an arm, $H^1$, which is connected by a link, $H^2$, to the arm $H^3$, so that when the knob H is turned the link $H^2$ receives a vertical motion. Upon this link $H^2$ is affixed a pointer, K. Upon the slide E is affixed another pointer, $K'$.

By taking hold of the knob H and pushing it up or down, a vertical motion is given to the slide E, and to the pointers L, K, and $K'$; but by turning the knob H a swing motion is given to the pointer L, and a vertical motion to the pointer K, while the pointer $K'$ will remain stationary.

The dial or chart shown on the face of the instrument in Fig. 1 consists of a set of curved, nearly horizontal, lines, which are numbered from 30 to 100, and correspond with the degrees of temperature marked on the auxiliary scale C. The curved lines, nearly vertical, marked from 10 to 100, are lines of relative humidity, while the diagonal lines give the dew-point. These lines are plotted from the standard hygromatic tables in the usual manner of plotting graphic tables.

The object of having the lower graduations of the auxiliary scale C is, that the lower ends of the relative humidity-lines of the graphic table may be far enough apart to be plainly distinguishable.

To use my instrument, I take hold of the knob H and raise or lower it until I bring the pointer $K'$ to a point on the scale C that corresponds to the temperature as indicated by the dry-bulb instrument; then, by turning the knob H to the left, I lower the pointer K to the point on the scale C that corresponds to the temperature as indicated by the wet-bulb thermometer; then the end of the pointer L will rest at the point on the graphic table that indicates by the vertical lines the relative humidity, and by the diagonal lines the dew-point.

Having now described the construction and operation of my invention, what I desire to secure by Letters Patent is as follows:

The combination of the auxiliary scale C, and the wet and dry bulb thermometers A B, with the pointers K $K'$ L and the graphic table, all operating together substantially as described, and for the purpose set forth.

NATHANIEL M. LOWE.

Witnesses:
  NATHL. EVANS,
  WILLIAM EDSON.